(12) United States Patent
Pollak et al.

(10) Patent No.: US 7,392,721 B2
(45) Date of Patent: Jul. 1, 2008

(54) METHOD FOR CONTROLLING A TWIN-CLUTCH TRANSMISSION

(75) Inventors: Burkhard Pollak, Graz (AT); Reinhard Berger, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 205 days.

(21) Appl. No.: 11/332,428

(22) Filed: Jan. 13, 2006

(65) Prior Publication Data

US 2006/0172855 A1     Aug. 3, 2006

(30) Foreign Application Priority Data

Jan. 15, 2005    (DE)  ............... 10 2005 001 976

(51) Int. Cl.
*F16H 3/08*      (2006.01)
(52) U.S. Cl. ........................................ 74/330
(58) Field of Classification Search ............... 74/340, 74/330, 339, 665 R, 329, 325, 331, 335; 477/72, 477/98, 94
See application file for complete search history.

(56) References Cited

U.S. PATENT DOCUMENTS

| | | | | |
|---|---|---|---|---|
| 4,877,116 A * | 10/1989 | Horsch | ...................... | 192/3.57 |
| 5,181,431 A * | 1/1993 | Zaiser et al. | ................... | 74/333 |
| 6,951,526 B2 * | 10/2005 | Kuhstrebe et al. | .............. | 477/97 |
| 7,066,043 B2 * | 6/2006 | Kim et al. | ...................... | 74/330 |
| 7,204,785 B2 * | 4/2007 | Berger et al. | ................... | 477/94 |
| 7,207,922 B2 * | 4/2007 | Kuhstrebe et al. | .............. | 477/97 |
| 7,258,032 B2 * | 8/2007 | Kim | ........................... | 74/330 |
| 2005/0115344 A1* | 6/2005 | Kim et al. | ...................... | 74/331 |
| 2005/0143220 A1* | 6/2005 | Berger et al. | ................... | 477/96 |

FOREIGN PATENT DOCUMENTS

| | | |
|---|---|---|
| DE | 35 46 454 | 2/1987 |
| DE | 101 09 662 | 9/2002 |

* cited by examiner

*Primary Examiner*—Dirk Wright
(74) *Attorney, Agent, or Firm*—Simpson & Simpson, PLLC

(57) ABSTRACT

A method of controlling a twin-clutch transmission with a first partial transmission with which are associated a first engine clutch and a first group of gears, and a second partial transmission with which are associated a second engine clutch and a second group of gears, said method containing the step of engaging a forward gear associated with one partial transmission and a reverse gear associated with the other partial transmission when the transmission, with the motor vehicle at a standstill, is in a non-driving position.

6 Claims, 2 Drawing Sheets

METHOD FOR CONTROLLING A TWIN-CLUTCH TRANSMISSION

CROSS REFERENCE TO RELATED APPLICATIONS

This patent application claims priority of German Patent Application No. 10 2005 001 976.5 filed Jan. 15, 2005, which application is incorporated herein by reference.

FIELD OF THE INVENTION

The invention relates to a method of controlling a twin-clutch transmission, particularly to a gear pre-selection strategy for wet twin-clutch transmissions.

BACKGROUND OF THE INVENTION

Twin-clutch transmissions consist of two partial transmissions, a group of gears and an engine clutch associated with each of them. Such a twin-clutch transmission is known, for example, from DE 35 46 454 A1.

Usually, the even-numbered gears are associated with one partial transmission and the odd-numbered gears with the other partial transmission so that in a normal, sequential gear-shifting operation, namely in going from an engaged old gear to the next higher or next lower target gear, one jumps between the partial transmissions. If the starting gear is associated with the first partial transmission, then first the engine clutch associated with the partial transmission of the new gear is opened, the new gear is engaged, and in a subsequent overlapping opening of the engine clutch associated with the partial transmission of the old gear and closing of the engine clutch associated with the partial transmission of the new gear, the new gear is engaged. The force transmission take place alternatingly via the first partial transmission with the first engine clutch and the first transmission input shaft and via the second partial transmission with the second engine clutch and the second transmission input shaft.

Twin-clutch transmissions are mostly automated, because manual operation of two engine clutches and gear-shifting with two gears engaged temporarily and at the same time would require a considerable mechanical effort.

From DE 101 09 662 A1 is known a control strategy for a twin-clutch transmission which is used in situations wherein multiple short-lasting changes in travel direction arise, for example when maneuvering from or in parking places or when rocking in snow. To avoid the many internal gear switching and clutching operations and at the same time minimize clutch wear, DE 101 09 662 A1 proposes, when a vehicle is in a travel direction-change mode in which frequent changes are made between forward and reverse travel, to keep a forward gear permanently engaged in one partial transmission and a reverse gear permanently engaged in the other partial transmission. The change in travel direction is then brought about by alternate opening of the engine clutch associated with one partial transmission and closing of the one associated with the other partial transmission. In the partial transmissions, the lowest of the reverse gears and the lowest of the forward gears are usually selected. Whether a vehicle is in a travel direction-change mode is determined either manually by actuation of a switch or automatically, a travel direction-change mode being assumed when within a certain predetermined time period several changes in travel direction are made to occur. The end of the travel direction-change mode is indicated, for example, by the brake pedal actuation exceeding a predetermined time interval or by the gas pedal actuation exceeding a certain brake pressure, a certain time interval or a predetermined pedal travel distance or the like.

Moreover, automated control of such a twin-clutch transmission often assumes pre-selection or early engagement of a starting gear when the vehicle is at a standstill and when the shift lever is in a non-driving position. In particular, this is intended to ensure a spontaneous reaction of the motor vehicle, particularly in combination with a parking brake that is actuated by the gear actuator. Moreover, particularly at low temperatures, pre-selection is often desirable to avoid switching noises, namely unpleasant noises during switching resulting from the drag torques in the clutch. Wet clutches have higher drag torques than do dry ones.

On the other hand, particularly under cold conditions when the viscosity of the clutch fluid (for example the transmission oil) is elevated, the drag torque can reach the magnitude of the creep torque of the motor vehicle so that it is possible for a vehicle with pre-selected starting gear to creep even though the clutch is not yet engaged, for example if the shift lever is in the neutral position (N) or park position (P).

BRIEF SUMMARY OF THE INVENTION

The invention is based on the idea that, in a position in which the clutches of the partial transmissions of the twin-clutch transmission are not engaged and the motor vehicle is supposed to be at a standstill, a gear pre-selection is made in both partial transmissions so that any creep torques arising in the clutches of the two partial transmissions or any output drive torques brought about by the creep torques are at least partly offset so that the vehicle is not placed in a condition in which it can creep. This means that the torques must be at least partly offset, namely to the point where the resulting output drive torque is lower than the torque that would be required for the motor vehicle to creep.

For this purpose, the invention provides a method of controlling a twin-clutch transmission with a first partial transmission with which are associated a first engine clutch and a first group of gears, and a second partial transmission with which are associated a second engine clutch and a second group of gears, whereby a forward gear associated with one partial transmission and a reverse gear associated with the other partial transmission are kept engaged when the transmission of a motor vehicle at standstill is in a non-driving position.

Preferably, when several reverse gears are present, the lowest of the reverse gears is used. Moreover, according to a preferred embodiment, the lowest of the forward gears of the partial transmission that does not contain the reverse gear is used. This is usually the first gear when the first gear and the reverse gear are associated with different partial transmissions. If the re-verse gear is associated with the group of odd-numbered gears, the combination of the second gear and the reverse gear is pre-selected. This is advantageous particularly under very cold conditions, because the first gear, as a result of the high creep torque of the wet transmission with the cold clutch fluid (clutch oil), does not engage or engages only with difficulty so that the vehicle would have to start in the second gear, in accordance with winter programs for automatically shifting transmissions. Hence, as an alternative, the second gear may in theory be selected as the starting gear.

Preferably, a temperature signal is sensed, and the method is carried out, namely the gears are engaged, only when the sensed temperature is below a predetermined temperature limit. When the clutch fluid is warm no increased drag torques arise as a result of viscous clutch fluid, drag torques that would cause the motor vehicle to creep, so that no specific control is needed in this case.

The sensed temperature is preferably the transmission oil temperature. The engine temperature, the cooling water temperature or an ambient temperature can also be used. Moreover, it is also possible to carry out the method only when several of the said temperatures are under a predetermined temperature limit. The temperatures are sensed by temperature sensors known in the art or by the control system based on other parameters.

Preferably, the method is carried out when the parking brake actuated by the transmission actuator, if such a brake is available, is engaged. Even if a differently designed parking brake is present, the criterion for engaging the gears, namely for carrying out the method of the invention, can be the engagement of the parking brake.

As an alternative, the method is preferably carried out only when, for example, the gears are engaged only when the engine of the motor vehicle is started and the parking brake is engaged.

Hence, the object of the invention is to provide a method of controlling a twin-clutch transmission whereby the undesirable creeping of the motor vehicle when the clutch is not engaged, particularly at low temperatures, can be avoided.

This objective is reached by means of a method having the features stated in Claim 1. Preferred embodiments are indicated in the dependent claims.

BRIEF DESCRIPTION OF THE DRAWINGS

In the following, the invention will be described with reference to the attached drawings in which.

DETAILED DESCRIPTION OF THE INVENTION

Figure 1:
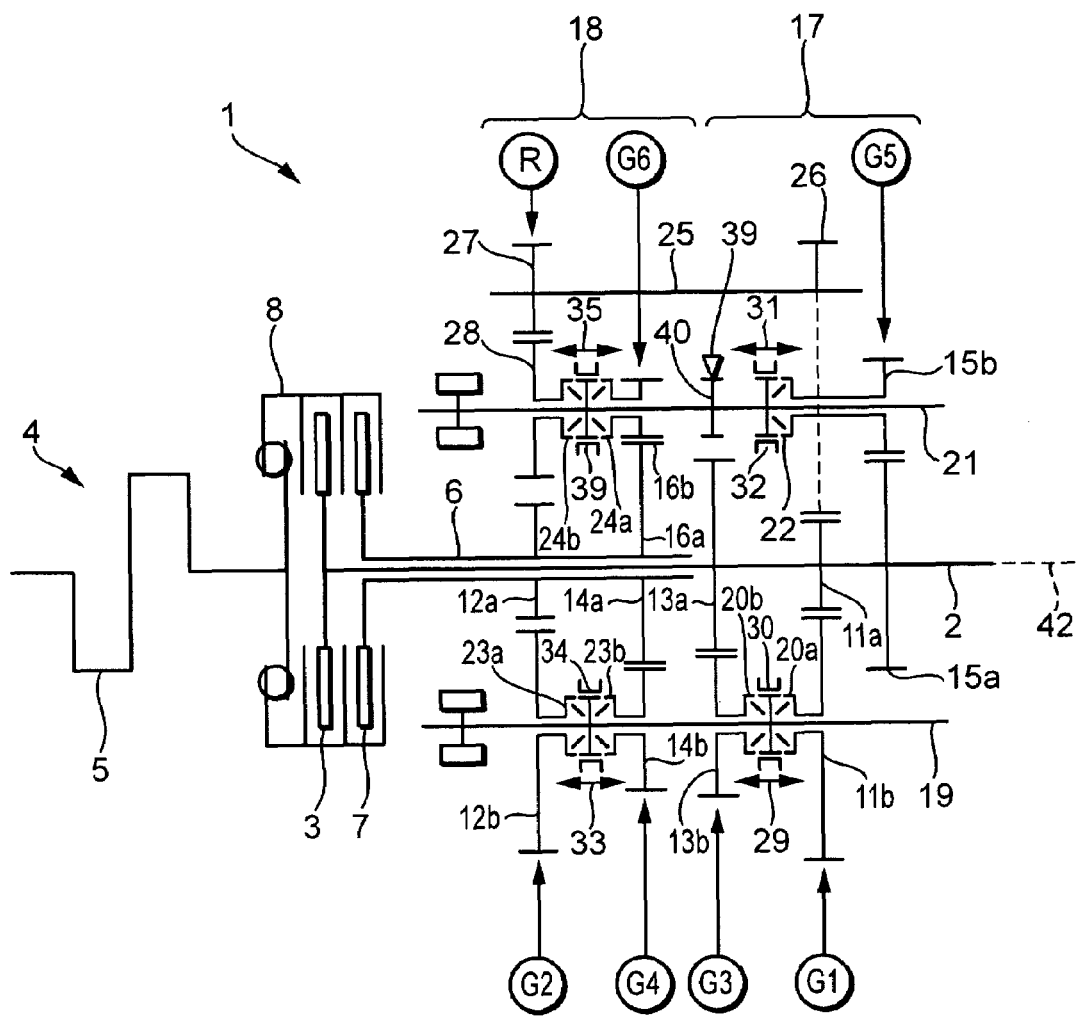
FIG. 1 is a schematic representation of a twin-clutch transmission.

A known twin-clutch transmission 1 schematically shown in FIG. 1 has a first transmission input shaft 2 which via a first engine clutch 3 can be connected with a driving engine 4 in the form of an internal combustion engine represented by a crankshaft 5.

Disposed coaxially with the first transmission input shaft 2 is a second transmission input shaft 6 in the form of a hollow shaft, the second transmission input shaft being able to be connected to the driving engine via second engine clutch 7. First engine clutch 3 and second engine clutch 7 are wet clutches and can, for example, be located in a common clutch cage 8.

With first transmission input shaft 2 are associated a pair of toothed wheels 11 of a first forward gear G1, a pair of toothed wheels 13 of a third forward gear G3 and a pair of toothed wheels 15 of a fifth forward gear G5, the stationary gears 11a, 13a, 15a being firmly connected with the first transmission input shaft 2. With the second transmission input shaft 6 are associated a pair of toothed wheels 12 of a second forward gear G2, a pair of toothed wheels 14 of a fourth forward gear G4 and a pair of toothed wheels 16 of a sixth forward gear G6, the corresponding stationary gears 12a, 14a, 16a being firmly connected with the second transmission input shaft 6. First engine clutch 3, first transmission input shaft 2 and forward gears G1, G3, G5 form a first partial transmission 17 whereas the second engine clutch 7, the second transmission input shaft 6 and forward gears G2, G4, G6 form the second partial transmission.

Idler wheels 11b and 13b of gears G1 and G3 of the first partial transmission 17 are rotatably supported on a first drive shaft 19 and via associated gearshift clutches 20a, 20b can be connected with first drive shaft 19 in rotation-resistant manner. Idler wheel 15b of fifth gear G5 of first partial transmission 17 is rotatably supported on a second drive shaft 21 and via an associated gearshift clutch 22 can be connected with a second drive shaft 21 in rotation-resisting manner. Idler wheels 12b and 14b of gears G2 and G4 of second partial transmission 18 are rotatably supported on the first drive shaft 19 and via associated drive shift clutches 23a, 23b are connected therewith in rotation-resisting manner. Idler wheel 16b of sixth gear G6 of second partial transmission 18 is rotatably supported on second drive shaft 21 and via an associated gear-shift clutch 24a is connected therewith in rotation-resisting manner.

A stationary wheel 26 of a reverse gear R disposed on an intermediate shaft 25 engages into stationary wheel 11a of first gear G1 and is thus connected with the first transmission input shaft 2. A second stationary wheel 27 of intermediate shaft 25 is engaged with an idler gear 28 rotatably supported on the second drive shaft 21, said idler gear being able to be connected with said shaft in rotation-resisting manner via an associated gearshift clutch 24b. Because of its connection with the first transmission input shaft 2, reverse gear. R is associated with the first partial transmission.

Gearshift clutches 20a and 20b of gears G1 and G3 can be actuated, namely closed and separated, by axial displacement 29 of a first shifting sleeve 30 whereby gears G1 and G3 can be disengaged. In the same manner, gearshift clutch 22 of the fifth gear can be actuated by axial displacement 31 of a second shifting sleeve 32. The first and second shifting sleeves 30, 32 are associated with the first partial transmission 17. Gearshift clutches 23a and 23b of gears G2 and G4 can be actuated by axial displacement 33 of a third shifting sleeve 34, whereas gearshift clutches 24a and 24b of gears G6 and R can be actuated by axial displacement 35 of a fourth shifting sleeve 36, with the third shifting sleeve 34 being associated with the second partial transmission 18 and the fourth shifting sleeve being a constituent of both partial transmissions 17, 18.

A parking brake 39 disposed and acting on a separate stationary toothed wheel 40 located on second drive shaft 21 is provided.

In the embodiment of the transmission shown in FIG. 1, reverse gear R and first gear G1 are associated with the same partial transmission 17. When, for example at low temperatures, the viscosity of the clutch fluid increases and, hence, it is probable that the drag torque will reach the magnitude of the creep torque, then according to the invention creeping of the vehicle with the clutch not engaged can be prevented if a forward gear is in a non-driving position (N, P). To this end, reverse gear R associated with partial transmission 17 and the lowest of the forward driving gears that are associated with the other partial transmission 18, in this case second gear G2, are pre-selected. This gear pre-selection is made particularly when the internal combustion engine is disengaged, for example when the motor vehicle is parked. If first gear G1 and reverse gear R were associated with different partial transmissions, both of these gears could be utilized. At any rate, the selection of the second gear as starting gear is often desirable, particularly at low temperatures (winter).

If the motor vehicle is started and the shift lever is in a non-driving position (P or N), the creeping torques generated at first drive shaft 19 or second drive shaft 21 by the drag torques of clutches 3, 7, shaft 21 offset each other by preselection of reverse gear R and forward gear G2 to the extent that creeping of the motor vehicle induced by the drag torques, namely without clutches 3, 7 being actively engaged, is prevented.

To determine whether the gears should be pre-selected according to the invention, there is preferably provided a temperature sensor (not shown) which directly measures the oil temperature of the transmission or of the clutch fluid, for example the transmission oil. From the temperature dependence of the viscosity of the clutch fluid, it is possible to determine for a motor vehicle at standstill and with the clutch not engaged when a gear pre-selection should be made in the form of a pre-selected reverse gear and a simultaneously pre-selected forward gear. This control is exerted through the transmission control device.

It is possible to acquire the temperature signal at the time when the motor vehicle is to be started, for example so that immediately after ignition, with the parking brake engaged, the transmission control device senses the transmission oil temperature (clutch fluid temperature) and engages both starting gears, it being possible to define a preferred sequential order between reverse and forward, when the transmission oil temperature or some other temperature used as criterion is below a certain limit value. This offers the advantage of carrying out the method in a specific manner when, after the motor vehicle has been at a standstill for some time, the temperature of the transmission oil has dropped below a predetermined level and the transmission oil thus has a certain increased viscosity which possibly could lead to a drag torque such that inadvertent creeping of the motor vehicle could take place.

As an alternative, the pre-selection gears are engaged already when the parking brake is applied. In this case the temperature criterion is less decisive, because, at least after a longer time, the clutch fluid presumably has reached a sufficiently high temperature. This has the advantage that, after the engine is started, the gears are available immediately and without delay after the parking brake has been disengaged. If second gear G2 and reverse gear R have been pre-selected, then depending on a temperature signal sent immediately after the disengagement of the parking brake to start the motor vehicle, the first gear is engaged when the shift lever is brought into position D (drive). Alternatively, the motor vehicle can be started in second gear.

The method is carried out when one of the non-driving stages (P or N) is selected. Alternatively, it is also possible to apply the strategy for either only P or only N. Depending on a time criterion, namely after a certain time has elapsed, the described pre-selection can be cancelled, because in this case, on the one hand, the clutch fluid has a sufficient temperature and thus again a lower viscosity and, on the other, the starting process is accelerated. In particular, after a certain time has elapsed with the shift lever in the neutral position (N) and with the engine running, it is preferred to cancel the pre-selection of the forward gear and the compensating reverse gear and to use only a starting strategy, in itself known, and accordingly pre-select the starting gear. This can be the same gear as the forward gear pre-selected according to the strategy for preventing inadvertent creeping or some other forward gear.

Figure 2:
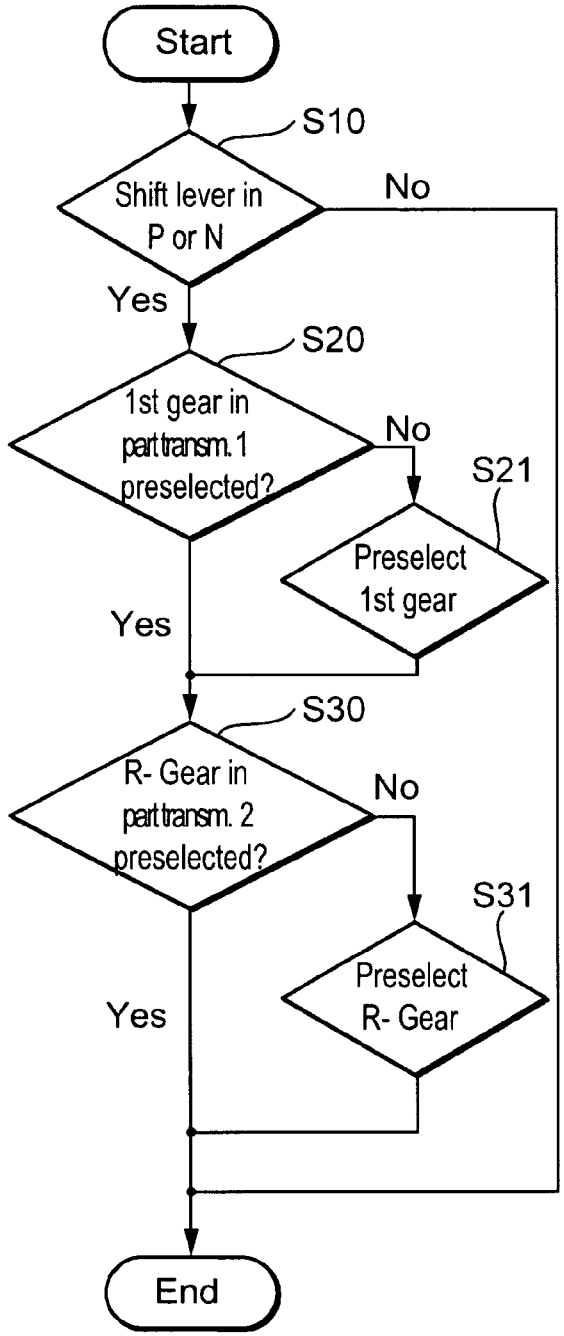
FIG. 2 is a flow diagram showing the gear pre-selection in a first embodiment of the invention; and, FIG. 3 is a flow diagram showing the gear pre-selection in a second embodiment of the invention.

FIG. 2 shows in the form of a flow diagram the execution of the method according to a first embodiment which applies when first gear G1 and the reverse gear are associated with different partial transmissions. After the beginning of the procedure, it is first determined in step S10 whether the shift lever is in position P or N, namely in a non-driving position. If the shift lever is not in the P or N position, the procedure stops without any other measures. If the P or N position has been selected, however, it is determined whether in the first partial transmission (partial transmission 17) first gear G1 is pre-selected. If in this step S20 it is determined that the first gear is not yet pre-selected, then it is pre-selected in step S21. Subsequently, in step S30 it is determined whether in the other partial transmission (partial transmission 18) reverse gear R is pre-selected. If this is not the case, said reverse gear is pre-selected in step S31. In this manner, a forward gear and a reverse gear, preferably the lowest forward gear and the lowest reverse gear of two different partial transmissions, are pre-selected in a manner such that the starting torques generated by the drag torques of the clutches offset each other to the extent that creeping of the motor vehicle without the clutch being engaged is not possible even when the viscosity of the clutch fluid is high.

Figure 3:
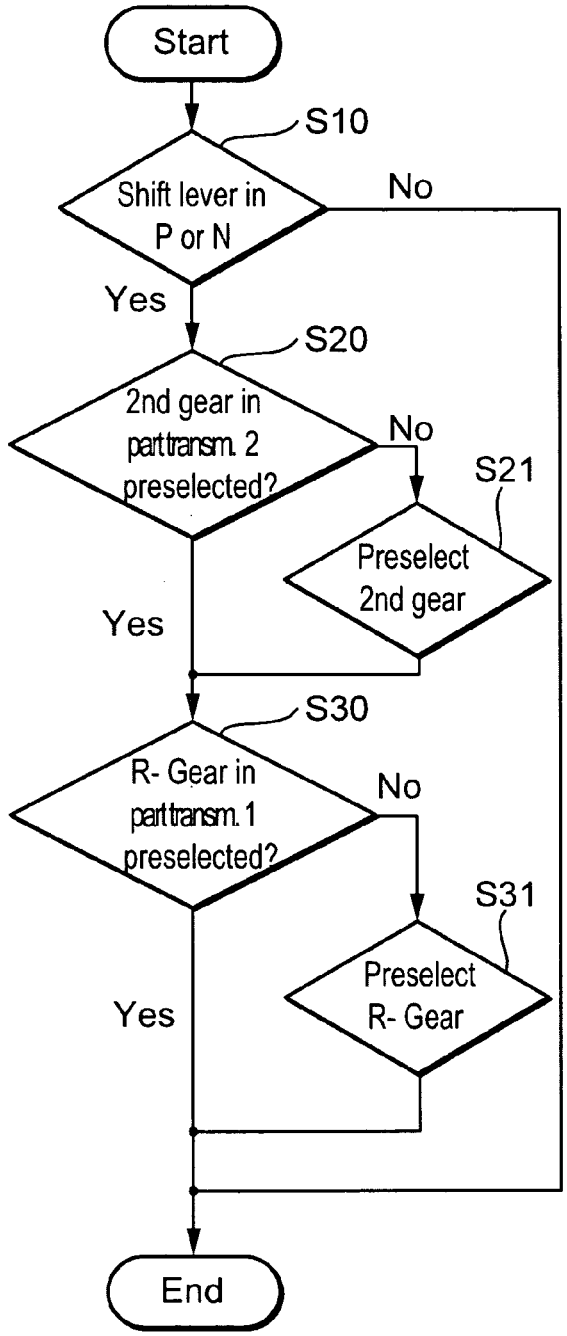

FIG. 3 shows a situation in which the first gear and the reverse gear are associated with the same partial transmission. The procedure differs from that shown in FIG. 2 in that in step S20 a determination is made of whether the second gear in the corresponding partial transmission is pre-selected and possibly in step S21 the second gear is pre-selected instead of the first gear.

Thus, the invention proposes a strategy for pre-selection of gears in the non-driving stages (P, N), particularly for wet twin-clutch transmissions and a resting engine or a parked motor vehicle. One starting gear for each travel direction is engaged in different partial transmissions. It is thus possible, at low temperatures, to avoid shifting problems resulting from an arising drag torque, which leads to the fact that the torques (wheel torques) generated by the drag torques of the two clutches offset each other partially at least to the extent that inadvertent creeping in the driving position N is prevented. By determining the temperature of the transmission oil or of the ambient temperature, the application of this strategy can be limited, for example, to the use conditions (low temperatures) under which increased drag torques must be expected.

LIST OF REFERENCE NUMERALS 1 twin-clutch transmission
2 (first) transmission input shaft
3 (first) engine clutch
4 driving motor
5 crankshaft
6 (second) transmission input shaft
7 (second) engine clutch
8 clutch cage
11 toothed wheel pair (of first gear G1)
11a stationary wheel (of first gear G1)
11b idler wheel (of first gear G1)
12 toothed wheel pair (of second gear G2)
12a stationary wheel (of second gear G2)
12b idler wheel (of second gear G2)
13 toothed wheel pair (of third gear G3)
13a stationary wheel (of third gear G3)
13b idler wheel (of third gear G3)
14 toothed wheel pair (of fourth gear G4)
14a stationary wheel (of fourth gear G4)
14b idler wheel (of fourth gear G4)
15 toothed wheel pair (of fifth gear G5)
15a stationary wheel (of fifth gear G5)
15b idler wheel (of fifth gear G4)
16 toothed wheel pair (of sixth gear G6)
16a stationary wheel (of sixth gear G6)
16b idler wheel (of sixth gear G6)
17 (first) partial transmission 18 (second) partial transmission
19 (first) drive shaft
20*a* gearshift clutch (of first gear G1)
20*b* gearshift clutch (of third gear G3)
21 (second) drive shaft
22 gearshift clutch (of fifth gear G5)
23*a* gearshift clutch (of second gear G2)
23*b* gearshift clutch (of fourth gear G4)
24*a* gearshift clutch (of sixth gear G6)
24*b* gearshift clutch (of reverse gear R)
25 intermediate shaft (of reverse gear R)
26 (first) stationary wheel (of reverse gear R)
27 (second) stationary wheel (of reverse gear R)
28 idler wheel (of reverse gear R)
29 axial displacement (of first shifting sleeve)
30 (first) shifting sleeve
31 axial displacement (of second shifting sleeve)
32 (second) shifting sleeve
33 axial displacement (of third shifting sleeve)
34 (third) shifting sleeve
35 axial displacement (of fourth shifting sleeve)
36 (fourth) shifting sleeve
39 parking brake
40 stationary toothed wheel
42 rotational axis (of transmission input shafts)
G1 first (forward) gear
G2 second (forward) gear
G3 third (forward) gear
G4 fourth (forward) gear
G5 fifth (forward) gear
G6 sixth (forward) gear
R reverse gear

What is claimed is:

1. A method of controlling a twin-clutch transmission with a first partial transmission with a first engine clutch and a first group of gears, and a second partial transmission with a second engine clutch and a second group of gears, comprising the steps of:
   disengaging the first and second clutches;
   acquiring a temperature signal;
   engaging a forward gear from the first group of gears when a sensed temperature is under a predetermined temperature limit;
   engaging a reverse gear from the second group of gears when the sensed temperature is under the predetermined temperature limit; and, maintaining the engagement of the forward and reverse gears, while the first and second clutches are disengaged.

2. The method as defined in claim 1, wherein several reverse gears are present, the lowest one is used.

3. The method as defined in claim 2, wherein the lowest of the forward gears of the partial transmission that does not contain the reverse gear is used.

4. The method as defined in claim 1, wherein the temperature signal indicates the transmission oil temperature, the engine clutch temperature, the cooling water temperature or the ambient temperature or else a combination thereof.

5. The method as defined in claim 2, wherein the gears are engaged when in the presence of a parking brake system the parking brake is engaged.

6. The method as defined in one of claim 1, wherein after the engine of a motor vehicle has been started, the gears are engaged when the parking brake is engaged.

* * * * *

UNITED STATES PATENT AND TRADEMARK OFFICE
CERTIFICATE OF CORRECTION

| | |
|---|---|
| PATENT NO. | : 7,392,721 B2 |
| APPLICATION NO. | : 11/332428 |
| DATED | : July 1, 2008 |
| INVENTOR(S) | : Burkhard Pollak and Reinhard Berger |

Page 1 of 1

It is certified that error appears in the above-identified patent and that said Letters Patent is hereby corrected as shown below:

Col. 8, line 29, Claim 6, should read: 6. The method as defined in claim 1, wherein after the engine of a motor vehicle has been started, the gears are engaged when the parking brake is engaged.

Signed and Sealed this

Second Day of September, 2008

JON W. DUDAS
*Director of the United States Patent and Trademark Office*